US012762038B2

(12) United States Patent
Darke et al.

(10) Patent No.: US 12,762,038 B2
(45) Date of Patent: Oct. 13, 2026

(54) METHOD AND SYSTEM FOR SOURCE CODE VERIFICATION USING MACHINE LEARNING BASED STRATEGY PREDICTION

(71) Applicant: Tata Consultancy Services Limited, Mumbai (IN)

(72) Inventors: Priyanka Darke, Pune (IN); Bharti Chimdyalwar, Pune (IN); Venkatesh Ramanathan, Pune (IN); Supratik Chakraborty, Mumbai (IN)

(73) Assignee: Tata Consultancy Services Limited, Mumbai (IN)

( * ) Notice: Subject to any disclaimer, the term of this patent is extended or adjusted under 35 U.S.C. 154(b) by 291 days.

(21) Appl. No.: 18/588,499

(22) Filed: Feb. 27, 2024

(65) Prior Publication Data

US 2024/0354219 A1 Oct. 24, 2024

(30) Foreign Application Priority Data

Apr. 24, 2023 (IN) ............................ 202321029623

(51) Int. Cl.
*G06F 11/3604* (2025.01)

(52) U.S. Cl.
CPC ................................ *G06F 11/3608* (2013.01)

(58) Field of Classification Search
CPC . G06F 11/3608; G06F 11/3604; G06N 3/044; G06N 3/045; G06N 3/08
USPC .......................................................... 717/120
See application file for complete search history.

(56) References Cited

U.S. PATENT DOCUMENTS

| | | | | |
|---|---|---|---|---|
| 8,856,726 | B2 * | 10/2014 | Conrad | G06F 11/3604 717/146 |
| 11,520,345 | B2 * | 12/2022 | Onofrio | G05D 1/65 |
| 12,002,055 | B1 * | 6/2024 | Miller | G06Q 30/04 |
| 2018/0131621 | A1 * | 5/2018 | Wu | H04L 41/145 |

(Continued)

OTHER PUBLICATIONS

Fang, Chunrong, et al. “Functional code clone detection with syntax and semantics fusion learning.” Proceedings of the 29th ACM SIGSOFT international symposium on software testing and analysis. 2020.pp. 516-527. (Year: 2020).*

(Continued)

*Primary Examiner* — Satish Rampuria
(74) *Attorney, Agent, or Firm* — Finnegan, Henderson, Farabow, Garrett & Dunner, LLP

(57) ABSTRACT

This disclosure relates generally to method and system for source code verification using machine learning based strategy prediction. The method receives a source code comprising a plurality of function properties to be verified. Further, the source code is sliced using at least one sequence slicer among a plurality of sequence slicers and a feature vector generator extracts a plurality of feature vectors from each slice. Further, a neural network generates a plurality likelihood of success values by applying a plurality of verification techniques over each feature vector among the plurality of feature vectors to predict a verification strategy to be applied over each slice to be verified. Furthermore, a verification result is displayed as one of a verification successful (S), a verification failure (F) and an unknown (U) when each slice is not verified for the verification strategy run out of time or memory.

16 Claims, 3 Drawing Sheets

(56) References Cited

U.S. PATENT DOCUMENTS

| | | | | |
|---|---|---|---|---|
| 2022/0248148 | A1* | 8/2022 | Verhulst | G06N 3/0464 |
| 2024/0241705 | A1* | 7/2024 | Mahajan | G06F 8/42 |

OTHER PUBLICATIONS

Le, Triet HM, Hao Chen, and Muhammad Ali Babar. "Deep learning for source code modeling and generation: Models, applications, and challenges." ACM Computing Surveys (CSUR) 53.3 (2020): pp. 1-38. (Year: 2020).*

Li, Guangjie, Hui Liu, and Ally S. Nyamawe. "A survey on renamings of software entities." ACM Computing Surveys (CSUR) 53.2 (2020): pp. 1-38. (Year: 2020).*

Xue, Hongfa, Guru Venkataramani, and Tian Lan. "Clone-slicer: Detecting domain specific binary code clones through program slicing." Proceedings of the 2018 Workshop on Forming an Eco-system Around Software Transformation. 2018. pp. 27-33. (Year: 2018).*

Eisenbarth, Thomas, Rainer Koschke, and Daniel Simon. "Locating features in source code." IEEE Transactions on software engineering 29.3 (2003): pp. 210-224. (Year: 2003).*

Sæbjørnsen, Andreas, et al. "Detecting code clones in binary executables." Proceedings of the eighteenth international symposium on Software testing and analysis. 2009. pp. 117-127. (Year: 2009).*

Dirk Beyer et al., "Strategy Selection for Software Verification Based on Boolean Features," Proc. ISOLA 2018, 2018, Springer, https://www.sosy-lab.org/research/pub/2018-ISoLA.Strategy_Selection_for_Software_Verification_Based_on_Boolean_Features.pdf.

Jian Zhang et al., "A Novel Neural Source Code Representation Based on Abstract Syntax Tree," IEEE/ACM 41st International Conference on Software Engineering (ICSE), 2018, IEEE, http://hongyujohn.github.io/ASTNN.pdf.

Will Leeson et al., "Algorithm Selection for Software Verification using Graph Attention Networks," University of Virginia, https://arxiv.org/pdf/2201.11711.pdf.

* cited by examiner

METHOD AND SYSTEM FOR SOURCE CODE VERIFICATION USING MACHINE LEARNING BASED STRATEGY PREDICTION

PRIORITY CLAIM

This U.S. patent application claims priority under 35 U.S.C. § 119 to: Indian Patent Application number 202321029623, filed on Apr. 24, 2023. The entire contents of the aforementioned application are incorporated herein by reference.

TECHNICAL FIELD

The disclosure herein generally relates to source code verification, and, more particularly, to method and system for source code verification using machine learning based strategy prediction.

BACKGROUND

Machine learning approaches are now being used by the software engineering community for a number of software engineering tasks, including software testing, source code representation, and source code analysis, including testing and vulnerability identification. Source code verification is crucial for the secure operation of software applications. For example, defect identification, for instance, must be carried out in all types of software applications. However, it is considered to be a challenging task as no single known technique succeeds on all source codes. Slicing can be used as a maintenance or reuse technique for tasks such as program understanding, debugging, regression testing, and function extraction from existing source code.

As an interactive tool, program slicing is a software analysis technique that identifies subset of program statements that may affect the computation at a specific program point. With the growth of machine learning and software engineering, faster analysis is necessary in agile development environment for scalable and accurate source code verification. Existing techniques lack in utilizing machine learning to verify errors in a source code based on verification strategies with heuristically defined time constraints. However, maintenance of the verification strategies is a challenge because each strategy caters to verifying only certain properties of the source code and this limits to prove safety of the source code within loops.

SUMMARY

Embodiments of the present disclosure present technological improvements as solutions to one or more of the above-mentioned technical problems recognized by the inventors in conventional systems. For example, in one embodiment, a system for source code verification using machine learning based strategy prediction is provided. The system includes receiving a source code comprising a plurality of function properties to be verified. The system further slice by using at least one sequence slicer among a plurality of sequence slicers the source code into a plurality of slices, wherein the sequence slicer includes at least one of a slice analyzer and a shallow slicer. Further, a feature vector generator extracts a plurality of feature vectors from each slice among the plurality of slices based on a true boolean value, a false boolean value and a plurality of boolean features, wherein each of the plurality of feature vectors indicates syntax and semantics of the source code. Further, a neural network generates a plurality likelihood of success values by applying a plurality of verification techniques over each feature vector among the plurality of feature vectors, wherein an input node in the neural network represents each feature vector, and an output node represents a likelihood of success value generated of each verification technique corresponding to the input node. Then, a verification strategy is predicted by the neural network by sorting the plurality of likelihood of success values of each verification technique corresponding to each feature vector in decreasing order and applying the verification strategy over each slice to be verified. Finally, a verification result is displayed as one of a verification successful(S) when each slice is successfully verified by the verification strategy, a verification failure (F) when each slice is verified by the verification strategy and at least one of the plurality of function properties fails in each slice, and an unknown (U) when each slice is not verified for the verification strategy run out of time or memory.

In another aspect, a method for source code verification using machine learning based strategy prediction is provided. The system includes receiving a source code comprising a plurality of function properties to be verified. The system further slice by using at least one sequence slicer among a plurality of sequence slicers the source code into a plurality of slices, wherein the sequence slicer includes at least one of a slice analyzer and a shallow slicer. Further, a feature vector generator extracts a plurality of feature vectors from each slice among the plurality of slices based on a true boolean value, a false boolean value and a plurality of boolean features, wherein each of the plurality of feature vectors indicates syntax and semantics of the source code. Further, a neural network generates a plurality likelihood of success values by applying a plurality of verification techniques over each feature vector among the plurality of feature vectors, wherein an input node in the neural network represents each feature vector, and an output node represents a likelihood of success value generated of each verification technique corresponding to the input node. Then, a verification strategy is predicted by the neural network by sorting the plurality of likelihood of success values of each verification technique corresponding to each feature vector in decreasing order and applying the verification strategy over each slice to be verified. Finally, a verification result is displayed as one of a verification successful(S) when each slice is successfully verified by the verification strategy, a verification failure (F) when each slice is verified by the verification strategy and at least one of the plurality of function properties fails in each slice, and an unknown (U) when each slice is not verified for the verification strategy run out of time or memory.

In yet another aspect, a non-transitory computer readable medium for receiving a source code comprising a plurality of function properties to be verified. The system further slice by using at least one sequence slicer among a plurality of sequence slicers the source code into a plurality of slices, wherein the sequence slicer includes at least one of a slice analyzer and a shallow slicer. Further, a feature vector generator extracts a plurality of feature vectors from each slice among the plurality of slices based on a true boolean value, a false boolean value and a plurality of boolean features, wherein each of the plurality of feature vectors indicates syntax and semantics of the source code. Further, a neural network generates a plurality likelihood of success values by applying a plurality of verification techniques over each feature vector among the plurality of feature vectors, wherein an input node in the neural network represents each feature vector, and an output node represents a likelihood of success value generated of each verification technique corresponding to the input node. Then, a verification strategy is predicted by the neural network by sorting the plurality of likelihood of success values of each verification technique corresponding to each feature vector in decreasing order and applying the verification strategy over each slice to be verified. Finally, a verification result is displayed as one of a verification successful(S) when each slice is successfully verified by the verification strategy, a verification failure (F) when each slice is verified by the verification strategy and at least one of the plurality of function properties fails in each slice, and an unknown (U) when each slice is not verified for the verification strategy run out of time or memory.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Embodiments herein provide a method and system for source code verification using machine learning based strategy prediction. The system enables providing a fast, reliable, and scalable verification strategy for source code verification. Software requires rigorous verification and analysis criteria to be satisfied to ensure absence of errors. The method of the present disclosure is a machine learning based verification strategy predictor that predicts sequence of verification techniques for verifying source code. There are multiple techniques for source code verification and each technique performs differently for different types of software programs or source codes. Herein, 'verification' may refer to finding error paths as well as proving validity of the input properties of the source code(s). The effectiveness of a verification technique is program and property dependent. Hence, without knowledge of the verification techniques that may be suitable for a given source code, the process of verification may be inefficient, cumbersome and time consuming. Experimental data suggests that each verification technique only functions with a specific class of the source code, which is one advantage of sequencing various verification procedures. When a new class is encountered, experts define a new verification strategy and strategy-selection algorithm of the verifier is updated which is a tedious task. Also, verification techniques must be re-defined in the event that a new verification approach is required in order to supplement the existing set of verification strategies. The method disclosed employs machine learning model to predict verification strategy for source code verification.

Figure 1:
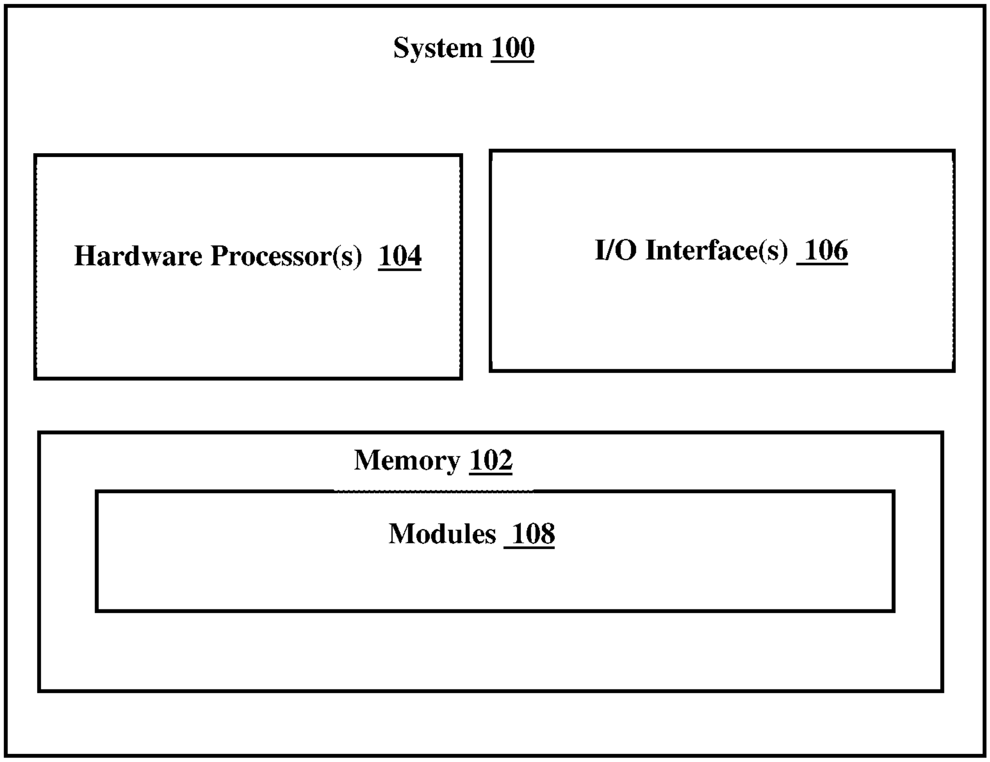
FIG. 1 illustrates an exemplary system for source code verification, in accordance with some embodiments of the present disclosure.
Figure 2:
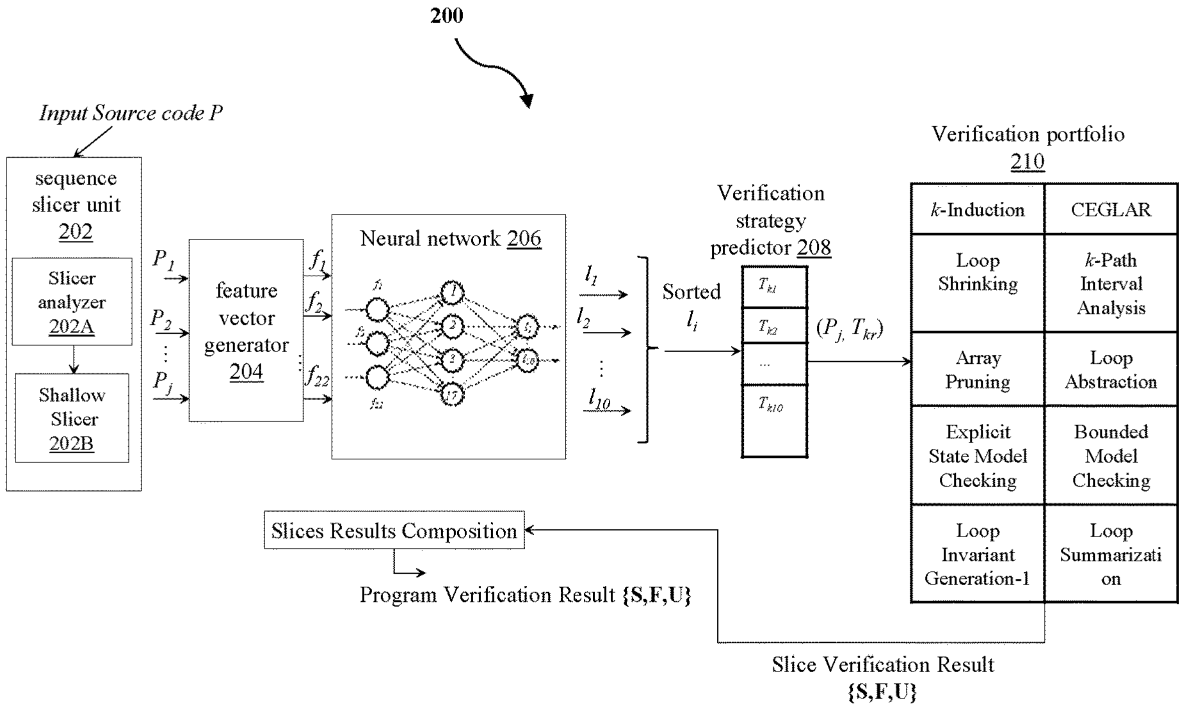
FIG. 2 is a functional block diagram illustration of an exemplary hardware implementation of the system of FIG. 1 for performing machine learning predicted verification strategy over a source code, in accordance with some embodiments of the present disclosure.
Figure 3:
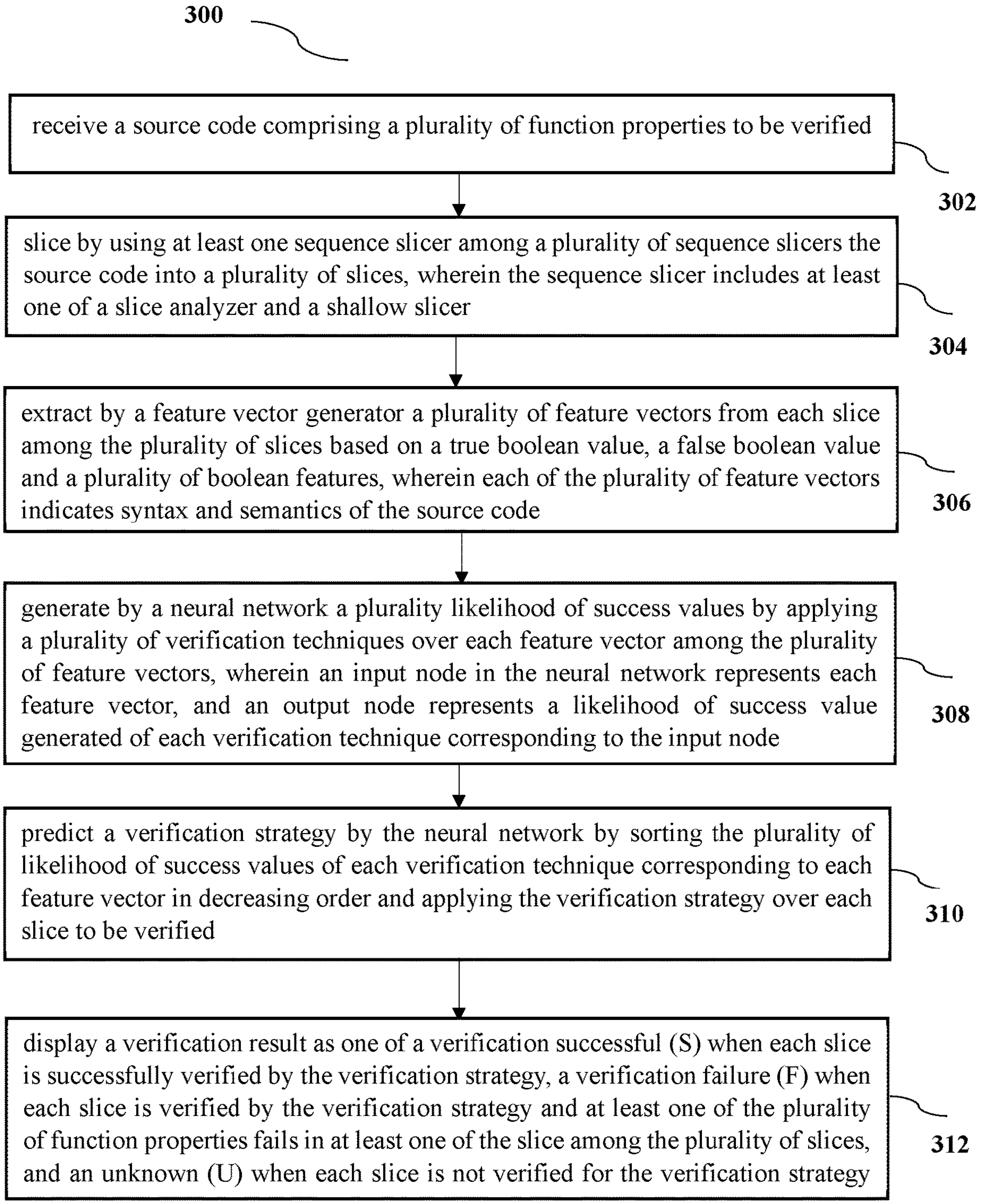
FIG. 3 is a flowchart of an exemplary method of operation for predicting verification strategy to be applied over the source code using the system of FIG. 1, in accordance with some embodiments of the present disclosure.

Referring now to the drawings, and more particularly to FIG. 1 through FIG. 3, where similar reference characters denote corresponding features consistently throughout the figures, there are shown preferred embodiments and these embodiments are described in the context of the following exemplary system and/or method.

FIG. 1 illustrates an exemplary system for source code verification, in accordance with some embodiments of the present disclosure. In an embodiment, system 100 includes processor(s) 104, communication interface(s), alternatively referred as or input/output (I/O) interface(s) 106, and one or more data storage devices or memory 102 operatively coupled to the processor(s) 104. System 100, with the processor(s) is configured to execute functions of one or more functional blocks of the system 100.

Referring to the components of the system 100, in an embodiment, the processor(s) 104 can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the processor(s) 104 is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud, and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface(s) 106 can include one or more ports for connecting a number of devices (nodes) of the system 100 to one another or to another server.

The memory 102 may include any computer-readable medium known in the art including, for example, volatile memory, such as static random-access memory (SRAM) and dynamic random-access memory (DRAM); and/or non-volatile memory, such as read only memory (ROM), erasable programmable ROM, flash memories, hard disks, optical disks, and magnetic tapes.

In an embodiment, the memory 102 includes a plurality of modules 108 can also include various sub-modules as depicted in FIG. 2 such as a sequence slicer unit 202, a feature vector generator 204, a neural network 206, a verification strategy predictor 208 and a verification portfolio 210 and so on. The plurality of modules 108 include programs or coded instructions that supplement applications or functions performed by the system 100 for executing different steps involved in the process of source code verification implemented using machine learning based strategy prediction of the system 100. The plurality of modules 108, amongst other things, can include routines, programs, objects, components, and data structures, which performs particular tasks or implement particular abstract data types. The plurality of modules 110 may also be used as, signal processor(s), node machine(s), logic circuitries, and/or any other device or component that manipulates signals based on operational instructions. Further, the plurality of modules 108 can be used by hardware, by computer-readable instructions executed by the one or more hardware processors 104, or by a combination thereof.

The memory 102 may comprise information pertaining to input(s)/output(s) of each step performed by the processor(s) 104 of the system 100 and methods of the present disclosure. Functions of the components of system 100, source code verification using machine learning based strategy prediction, are explained in conjunction with FIG. 2 and FIG. 3 providing flow diagram, architectural overviews, and performance analysis of the system 100.

FIG. 2 is a functional block diagram illustration of an exemplary hardware implementation of the system of FIG. 1 for performing machine learning predicted verification strategy over a source code, in accordance with some embodiments of the present disclosure. The system 200 may be an example of the system 100 (FIG. 1). In an example embodiment, the system 200 may be embodied in, or is in direct communication with the system, for example the system 100 (FIG. 1). In an embodiment, the system 200 may be alternatively referred as a source code verifier. The system 200 includes a sequence slicer unit 202, a feature vector generator 204, a neural network 206, a verification strategy predictor 208 and a verification portfolio 210.

The sequence slicer unit 202 of the system 100 includes a slicer analyzer 202A and a shallow slicer 202B which receives an input source code P to be verified. The slicer analyzer 202A performs a scalable slicing of the input source code P with respect to calls in entry function main. The shallow slicer 202B slices the input source code P and allows multiples calls in entry function main which refers to the same global variable and transitively invokes the same function. For example, a verification by abstraction tool (VeriAbsL) tool is a reachability verifier that verifies the source code P. Referring to the following example (Example 1 in Table 1) having the source code P to be verified using a machine learning based verification strategy.

TABLE 1

| Example 1 |
|---|

```
int main( ){
  int i=0;
  int N = 1000;
  int *a = malloc(size of(int)*N);
  for(i = 0; i < N; i++){
    a[i]=i;
  }
return 0;}
```

In the present example the source code P is input to the VeriAbsL tool which verifies whether the source code can be sliced. The source code P that can be sliced are divided into a plurality of slices ($P_1$, $P_2$, $P_3$ . . . . $P_j$).

The feature vector generator 204 of the system 100 extracts a plurality of feature vectors $\vec{f}$ comprising features ($f_1$, $f_2$, $f_3$ . . . $f_n$) from each slice among the plurality of slices based on a true boolean value, a false boolean value and a plurality of boolean features. Each feature vector indicate syntax and semantics of the input slice $P_j$. For example, the true boolean feature $f_i \in \hat{f}$ indicates the presence of arrays in the source code $P_j$ and the false boolean feature indicates that no arrays are used in corresponding slice.

The neural network 206 of the system 100 receives each feature vector $\vec{f}$ of each slice $P_j$ to generate a plurality of likelihood of success values ($l_1$, $l_2$, $l_3$ . . . $l_i$) by applying a plurality of verification techniques. The VeriAbsL tool uses a three layered neural network with multi-class classification for example 10 classes for 10 verifications techniques in a verification portfolio 210. In the neural network 206 an input node represents the feature vector, and an output node represents a likelihood of success value generated for the verification technique corresponding to the input node.

The verification strategy predictor 208 of the system 100 predicts a verification strategy by sorting the plurality of likelihood of success values $l_i$ of each verification technique.

The verification portfolio 210 of the system 100 applies the verification strategy over each slice to be verified. The plurality of verification techniques may include for example a k-Induction, a loop shrinking, and an array pruning and the like.

FIG. 3 is a flowchart of an exemplary method of operation for predicting verification strategy to be applied over the source code using the system of FIG. 1, in accordance with some embodiments of the present disclosure. In an embodiment, the system 100 comprises one or more data storage devices or the memory 102 operatively coupled to the processor(s) 104 and is configured to store instructions for execution of steps of the method 300 by the processor(s) or one or more hardware processors 104. The steps of the method 300 of the present disclosure will now be explained with reference to the components or blocks of the system 100 as depicted in FIG. 1 through FIG. 2, and the steps of flow diagram as depicted in FIG. 3. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring to the steps of the method 300, at step 302 receiving via one or more hardware processor 104, a source code comprising a plurality of function properties to be verified. For example, the VeriAbsL tool receives the input source code P to be verified.

Referring to the steps of the method 300, at step 304 slicing by using at least one sequence slicer among a plurality of sequence slicers the source code into a plurality of slices. The sequence slicer 200 includes at least one of the slice analyzer 202A and the shallow slicer 202B. The sequence slicer 200 divides the source code P into a plurality of slices ($P_1$, $P_2$, $P_3$ . . . . $P_j$).

Referring to the steps of the method 300, at step 306 includes extracting by the feature vector generator a plurality of feature vectors from each slice a vectors indicates of slices based on a true boolean value, a false boolean value and a plurality of boolean features, wherein each of the plurality of feature vectors indicates syntax and semantics of the source code P.

The plurality of boolean features comprises a goto label in program, a goto label in loop, an unstructured forward-backward edges in loop, if array modified in loop, a constant reset in loop, a linear acceleration in loop, a linear acceleration intensive loop, a self-recurrence in loop, a mutual-recurrence in loop, a too-many if else in the source code, a non-linear operation in loop, a non-linear operations intensive loop, a non-linear operations in assertion, a no-loop, a small-known bound loop, a known-max bound loop, a unknown-bound loop, an infinite-loop, a multiple loop, a nested loop, and a recursive program.

The true boolean value is updated in each feature vector when the plurality of boolean features are present in each feature vector. The false boolean value is updated in each feature vector when the plurality of boolean features is absent in each feature vector.

For the above example the plurality of feature vectors present in the source code as represented in Table 2. From the Table 2, (GL indicates goto labels, and UFB indicates unstructured forward-backward edges)

of success values in descending order. For example, the following the plurality of likelihood of success values are generated for corresponding verification technique present in the verification portfolio 210 $l_i$=0.43807328 0.28551188 0.13186349 0.057359967 0.049513955 0.019339733 0.010554153 0.004746521 0.0015238631 0.00055219093. The probability of corresponding verification technique “Array Pruning” is maximum, which is 0.44, for the input source code P and result shows that the verification technique is able to verify program in 24 secs.

Referring to the steps of the method 300, at step 310 includes predicting a verification strategy by the neural network by sorting the plurality of likelihood of success values of each verification technique corresponding to each feature vector in decreasing order and applying the verification strategy over each slice to be verified. The verification strategy predictor 210 sorts the plurality of likelihood of success values $l_i$ is at all output nodes of the neural network

TABLE 2

Feature vectors of the input source code

| GL in source code | GL in-loop | UFB in loop | UFB in prog | if array modified in loop | constant reset in loop | linear acceleration in loop | linear acceleration intensive loop | self-recurrence in loop | mutual-recurrence in loop | too-many if else in the source code |
|---|---|---|---|---|---|---|---|---|---|---|
| 0 | 0 | 0 | 0 | 1 | 0 | 1 | 0 | 0 | 0 | 0 |
| non-linear operations in assertion | a non-linear operations intensive | no-loop | | small-known bound loop | known-max bound loop | unknown-bound loop | infinite-loop | multiple loop | nested loop | recursive program |
| 0 | 0 | 0 | | 0 | 1 | 0 | 0 | 0 | 0 | 0 |

With the above Table 2, for the given example, the plurality of extracted feature vector identified features may be for example “if array-mod-in-loop”, “linear-acceleration-in-loop” and “known-max-bound-loop” which are identified as True and further each feature vector is given to the neural network 206 for the verification strategy predictor.

Referring to the steps of the method 300, at step 308 the neural network 206 generates a plurality likelihood of success values by applying a plurality of verification techniques over each feature vector among the plurality of feature vectors. In the neural network 206 an input node represents each feature vector, and an output node represents a likelihood of success value generated of each verification technique corresponding to the input node.

The neural network 206 of the system 100 includes three layers where a first layer comprises 22 neurons, a second layer comprises 17 neurons and a third layer comprises 10 neurons and was trained using a rectified linear unit (Relu) and (for the output layer) softmax activation functions and mean-squared-error loss function. The neural network 206 translates the input feature vector $\vec{f}$ representing the source code P into the plurality of likelihood of success values $l_i$, $1 \le i \le 10$ of the corresponding verification technique $T_i$ in the verification portfolio 210 on the source code P. Each output node $n_i$ of the neural network 206 represents one verification technique $T_i$ and corresponding likelihood of success value $l_i$ generated by the neural network 206 at that node $n_i$ is the likelihood of success of the corresponding technique $T_i$.

For the above example, the neural network 206 of the system 100 predicts probabilities for each verification technique and the VeriAbsL tool sorts the plurality of likelihood 206 in decreasing order and invokes corresponding verification technique $T_i$ in that order. For example, the verification strategy is represented as ($T_{k1}$, $T_{k2}$, . . . . $T_{k10}$), $1 \le k_r \le 10, 1 \le r \le 10$, verification strategy the plurality of likelihoods of success $l_i$ of each verification technique $T_i$ in decreasing order.

Referring to the steps of the method 300, at step 312 includes displaying a verification result as one of a verification successful(S) when each slice is successfully verified by the verification strategy, a verification failure (F) when each slice is verified by the verification strategy and at least one of the plurality of function properties fails in at least one of the slice among the plurality of slices, and an unknown (U) when each slice is not verified for the verification strategy run out of time or memory.

The machine learning based strategy prediction verifies 475 or 7.5% more reach safety benchmarks than VeriAbs tool that uses the same verification technique portfolio as VeriAbsL. This is because for those benchmarks the VeriAbsL tool predicted successful verification techniques early in its strategies. However, when the VeriAbs tool is selected an unsuitable strategy ran out of time. Further the VeriAbsL tool took 4.4% lesser time compared to the VeriAbs and verified 1047 and 543 more Reach-Safety benchmarks compared to the other machine learning based strategy prediction tools, for example Graves and Pesco respectively.

The written description describes the subject matter herein to enable any person skilled in the art to make and use the embodiments. The scope of the subject matter embodiments is defined herein and may include other modifications that occur to those skilled in the art. Such other modifications are intended to be within the scope of the present disclosure if they have similar elements that do not differ from the literal language of the present disclosure or if they include equivalent elements with insubstantial differences from the literal language of the embodiments described herein.

The embodiments of present disclosure herein addresses unresolved problem of source code verification. The embodiment, thus provides method and system for source code verification using machine learning based strategy prediction. Moreover, the embodiments herein further provides a reachability verifier that performs verification in three stages. The method of the present disclosure divides the input source code using a combination of two slicers and secondly verifies each slice using predicted verification strategies, and lastly composes the result of verifying the individual slices. The feature vector generator generates a boolean feature vector to describe the input source code and pass it to the neural network to forecast the verification strategy. The neural network predicts a verification strategy for the input source code P. The verification strategy is sequence of verification techniques from verification portfolio in the order of likelihood of success.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words “comprising,” “having,” “containing,” and “including,” and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms “a,” “an,” and “the” include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term “computer-readable medium” should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for source code verification, the method comprising:

receiving via one or more hardware processor, a source code further comprising a plurality of function properties to be verified;

slicing by using at least one sequence slicer among a plurality of sequence slicers executed via the one or more hardware processors, the source code into a plurality of slices, wherein the sequence slicer includes a slice analyzer and a shallow slicer, wherein the slicer analyzer performs a scalable slicing of the source code with respect to calls in an entry function main and the shallow slicer slices the source code and allows multiple calls in the entry function main corresponding to a global variable and transitively invokes same entry function;

extracting by a feature vector generator executed via the one or more hardware processors, a plurality of feature vectors from each slice among the plurality of slices based on a true boolean value, a false boolean value and a plurality of boolean features, wherein each of the plurality of feature vectors indicates syntax and semantics of the source code;

generating by a neural network executed via the one or more hardware processors, a plurality likelihood of success values by applying a plurality of verification techniques over each feature vector among the plurality of feature vectors, wherein an input node in the neural network represents each feature vector, and an output node represents a likelihood of success value generated of each verification technique corresponding to the input node, wherein the neural network includes three layers including a first layer with a first predefined number of neurons, a second layer with a second predefined number of neurons and a third layer with a third predefined number of neurons, and trained using a rectified linear unit (Relu), softmax activation functions and a mean-squared-error loss function, wherein the neural network translates an input feature vector representing the source code into a plurality of likelihood of success values $l_i$, $1 \leq i \leq 10$ of a corresponding verification technique in a verification portfolio on the source code, and each output node $n_i$ of the neural network represents one verification technique $T_i$ and corresponding likelihood of success value $l_i$ generated by the neural network at that node $n_i$ is the likelihood of success of the corresponding verification technique $T_i$;

predicting a verification strategy by the neural network executed via the one or more hardware processors, by sorting the plurality of likelihood of success values of each verification technique corresponding to each feature vector in decreasing order and applying the verification strategy over each slice to be verified; and displaying via the one or more hardware processors, a verification result as one of a verification successful(S) when each slice is successfully verified by the verification strategy, a verification failure (F) when each slice is verified by the verification strategy and at least one of the plurality of function properties fails in each slice, and an unknown (U) when each slice is not verified for the verification strategy run out of time or memory.

2. The processor implemented method as claimed in claim 1, wherein the plurality of boolean features comprises a goto label in the source code, a goto label in loop, an unstructured forward-backward edges in loop, if array modified in loop, a constant reset in loop, a linear acceleration in loop, a linear acceleration intensive loop, a self-recurrence in loop, a mutual-recurrence in loop, a too-many if else in the source code, a non-linear operation in loop, a non-linear operations intensive loop, a non-linear operations in assertion, a no-loop, a small-known bound loop, a known-max bound loop, an unknown-bound loop, an infinite-loop, a multiple loop, a nested loop, and a recursive source code.

3. The processor implemented method as claimed in claim 1, wherein the true boolean value is updated in each feature vector when the plurality of boolean features are present in each feature vector.

4. The processor implemented method as claimed in claim 1, wherein the false boolean value is updated in each feature vector when the plurality of boolean features are absent in each feature vector.

5. The processor implemented method as claimed in claim 1, wherein the verification strategy is predicted by sorting the plurality of likelihood of success values in decreasing order and applying the verification strategy to verify each slice among the plurality of slices.

6. A system for source code verification, comprising:

a memory storing instructions;

one or more communication interfaces; and one or more hardware processors coupled to the memory via the one or more communication interfaces, wherein the one or more hardware processors are configured by the instructions to:

receive a source code further comprising a plurality of function properties to be verified;

slice by using at least one sequence slicer among a plurality of sequence slicers, the source code into a plurality of slices, wherein the sequence slicer includes of a slice analyzer and a shallow slicer, wherein the slicer analyzer performs a scalable slicing of the source code with respect to calls in an entry function main and the shallow slicer slices the source code and allows multiple calls in the entry function main corresponding to a global variable and transitively invokes same entry function;

extract by a feature vector generator a plurality of feature vectors from each slice among the plurality of slices based on a true boolean value, a false boolean value and a plurality of boolean features, wherein each of the plurality of feature vectors indicates syntax and semantics of the source code;

generate by a neural network a plurality likelihood of success values by applying a plurality of verification techniques over each feature vector among the plurality of feature vectors, wherein an input node in the neural network represents each feature vector, and an output node represents a likelihood of success value generated of each verification technique corresponding to the input node, wherein the neural network includes three layers including a first layer with a first predefined number of neurons, a second layer with a second predefined number of neurons and a third layer with a third predefined number of neurons, and trained using a rectified linear unit (Relu), softmax activation functions and a mean-squared-error loss function, wherein the neural network translates an input feature vector representing the source code into a plurality of likelihood of success values $l_i$, $1 \leq i \leq 10$ of a corresponding verification technique in a verification portfolio on the source code, and each output node $n_i$ of the neural network represents one verification technique $T_i$ and corresponding likelihood of success value $l_i$ generated by the neural network at that node $n_i$ is the likelihood of success of the corresponding verification technique $T_i$;

predict a verification strategy by the neural network by sorting the plurality of likelihood of success values of each verification technique corresponding to each feature vector in decreasing order and applying the verification strategy over each slice to be verified; and display a verification result as one of a verification successful(S) when each slice is successfully verified by the verification strategy, a verification failure (F) when each slice is verified by the verification strategy and at least one of the plurality of function properties fails in each slice, and an unknown (U) when each slice is not verified for the verification strategy run out of time or memory.

7. The system of claim 6, wherein the plurality of boolean features comprises a goto label in the source code, a goto label in loop, an unstructured forward-backward edges in loop, if array modified in loop, a constant reset in loop, a linear acceleration in loop, a linear acceleration intensive loop, a self-recurrence in loop, a mutual-recurrence in loop, a too-many if else in the source code, a non-linear operation in loop, a non-linear operations intensive loop, a non-linear operations in assertion, a no-loop, a small-known bound loop, a known-max bound loop, an unknown-bound loop, an infinite-loop, a multiple loop, a nested loop, and a recursive source code.

8. The system of claim 6, wherein the true boolean value is updated in each feature vector when the plurality of boolean features are present in each feature vector.

9. The system of claim 6, wherein the false boolean value is updated in each feature vector when the plurality of boolean features are absent in each feature vector.

10. The system of claim 6, wherein the verification strategy is predicted by sorting the plurality of likelihood of success values in decreasing order and applying the verification strategy to verify each slice among the plurality of slices.

11. One or more non-transitory machine-readable information storage mediums comprising one or more instructions which when executed by one or more hardware processors cause:

receiving a source code further comprising a plurality of function properties to be verified;

slicing by using at least one sequence slicer among a plurality of sequence slicers, the source code into a plurality of slices, wherein the sequence slicer includes of a slice analyzer and a shallow slicer, wherein the slicer analyzer performs a scalable slicing of the source code with respect to calls in an entry function main and the shallow slicer slices the source code and allows multiple calls in the entry function main corresponding to a global variable and transitively invokes same entry function;

extracting by a feature vector generator, a plurality of feature vectors from each slice among the plurality of slices based on a true boolean value, a false boolean value and a plurality of boolean features, wherein each of the plurality of feature vectors indicates syntax and semantics of the source code;

generating by a neural network, a plurality likelihood of success values by applying a plurality of verification techniques over each feature vector among the plurality of feature vectors, wherein an input node in the neural network represents each feature vector, and an output node represents a likelihood of success value generated of each verification technique corresponding to the input node, wherein the neural network includes three layers including a first layer with a first predefined number of neurons, a second layer with a second predefined number of neurons and a third layer with a third predefined number of neurons, and trained using a rectified linear unit (Relu), softmax activation functions and a mean-squared-error loss function, wherein the neural network translates an input feature vector representing the source code into a plurality of likelihood of success values $l_i$, $1 \leq i \leq 10$ of a corresponding verification technique in a verification portfolio on the source code, and each output node $n_i$ of the neural network represents one verification technique $T_i$ and corresponding likelihood of success value $l_i$ generated by the neural network at that node $n_i$ is the likelihood of success of the corresponding verification technique $T_i$;

predicting a verification strategy by the neural network, by sorting the plurality of likelihood of success values of each verification technique corresponding to each feature vector in decreasing order and applying the verification strategy over each slice to be verified; and displaying a verification result as one of a verification successful(S) when each slice is successfully verified by the verification strategy, a verification failure (F) when each slice is verified by the verification strategy and at least one of the plurality of function properties fails in each slice, and an unknown (U) when each slice is not verified for the verification strategy run out of time or memory.

12. The one or more non-transitory machine-readable information storage mediums of claim 11, wherein the plurality of boolean features comprises a goto label in the source code, a goto label in loop, an unstructured forward-backward edges in loop, if array modified in loop, a constant reset in loop, a linear acceleration in loop, a linear acceleration intensive loop, a self-recurrence in loop, a mutual-recurrence in loop, a too-many if else in the source code, a non-linear operation in loop, a non-linear operations intensive loop, a non-linear operations in assertion, a no-loop, a small-known bound loop, a known-max bound loop, an unknown-bound loop, an infinite-loop, a multiple loop, a nested loop, and a recursive source code.

13. The one or more non-transitory machine-readable information storage mediums of claim 11, wherein the true boolean value is updated in each feature vector when the plurality of boolean features are present in each feature vector.

14. The one or more non-transitory machine-readable information storage mediums of claim 11, wherein the false boolean value is updated in each feature vector when the plurality of boolean features are absent in each feature vector.

15. The one or more non-transitory machine-readable information storage mediums of claim 11, wherein the verification strategy is predicted by sorting the plurality of likelihood of success values in decreasing order and applying the verification strategy to verify each slice among the plurality of slices.

16. The one or more non-transitory machine-readable information storage mediums of claim 11, wherein the verification strategy is predicted by sorting the plurality of likelihood of success values in decreasing order.

* * * * *